United States Patent [19]
Schell

[11] 4,143,677
[45] Mar. 13, 1979

[54] EXHAUST SYSTEM FOR VEHICLE
[75] Inventor: Ralph C. Schell, Decatur, Ill.
[73] Assignee: Caterpillar Tractor Co., Peoria, Ill.
[21] Appl. No.: 791,905
[22] Filed: Apr. 28, 1977
[51] Int. Cl.$^2$ ............................................. F16K 11/02
[52] U.S. Cl. ............................... 137/875; 137/625.44; 137/878; 298/1 H
[58] Field of Search ................... 137/625.44, 875, 878; 251/78, 354; 298/1 H

[56] References Cited
U.S. PATENT DOCUMENTS

| | | | |
|---|---|---|---|
| 1,502,842 | 7/1924 | Beiswenger | 137/625.44 |
| 1,550,419 | 8/1925 | Beaurline | 137/625.44 |
| 1,637,761 | 8/1927 | Butler | 137/625.44 X |
| 1,813,273 | 7/1931 | Bovey | 137/625.44 X |
| 3,039,493 | 6/1962 | Licari | 298/1 H X |
| 3,664,706 | 5/1972 | Chant | 298/1 H |
| 3,695,708 | 10/1972 | Vincenty | 298/1 H |
| 3,731,973 | 5/1973 | Kermode | 298/1 H |
| 3,994,530 | 11/1976 | Zaborsky et al. | 298/1 H |
| 4,002,370 | 1/1977 | Blackmore | 298/1 H |

Primary Examiner—Gerald A. Michalsky
Attorney, Agent, or Firm—Phillips, Moore, Weissenberg, Lempio & Majestic

[57] ABSTRACT

An exhaust system for a vehicle includes a valve including a valving element movable to a first position upon movement of a portion of the vehicle body to a raised position, whereby exhaust from the vehicle engine is directed to a muffler, while with the portion of the vehicle body in a lowered position and with the valving element moved to a second position, the engine exhaust is directed partially through the muffler, and partially through a member of the body portion. An over-center spring is connected to the valving element to bias it towards its first and second positions whereas a plunger is connected to the valving element to move it to its second position in response to lowering of the vehicle body.

5 Claims, 5 Drawing Figures

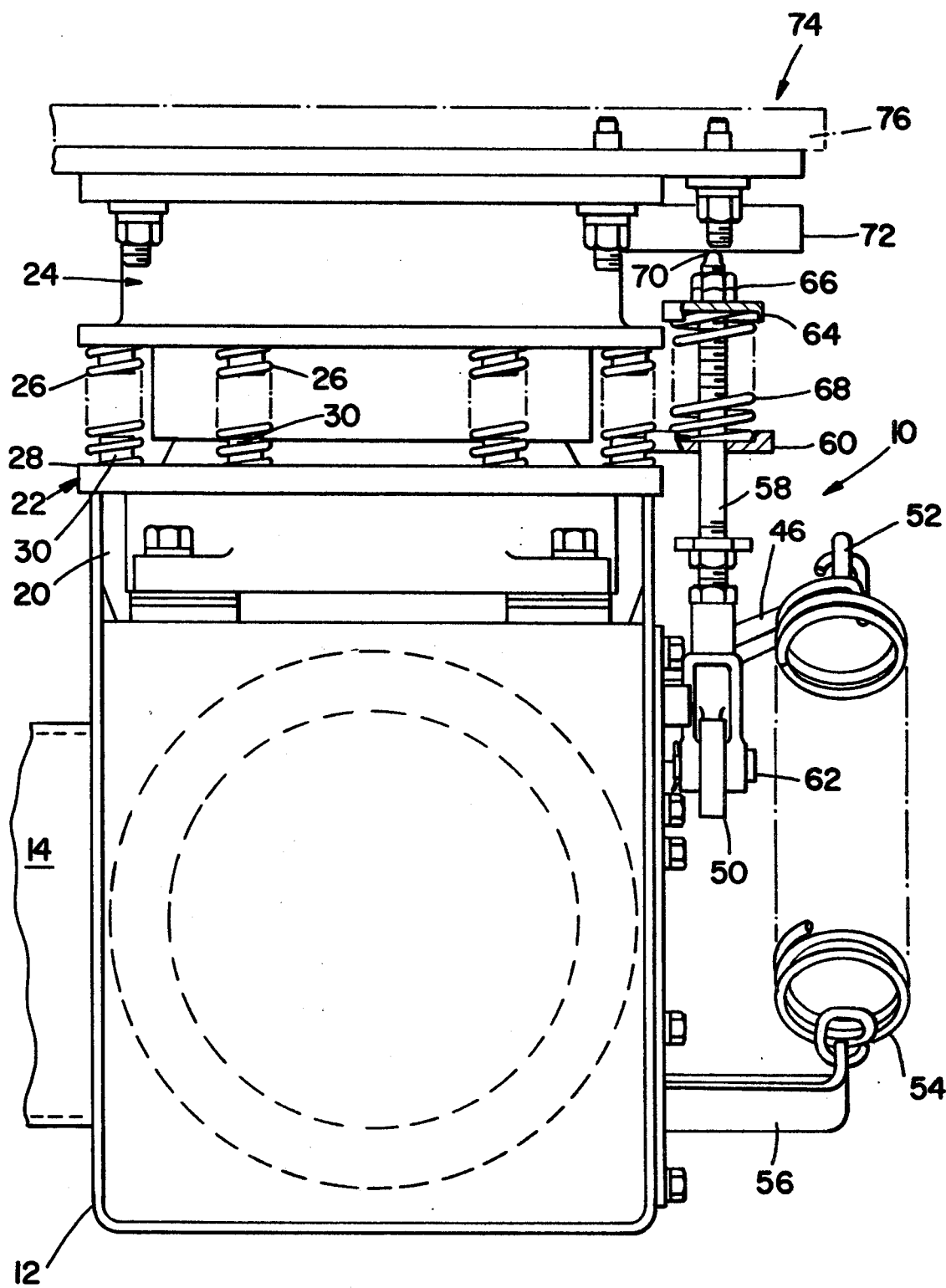
FIG_1

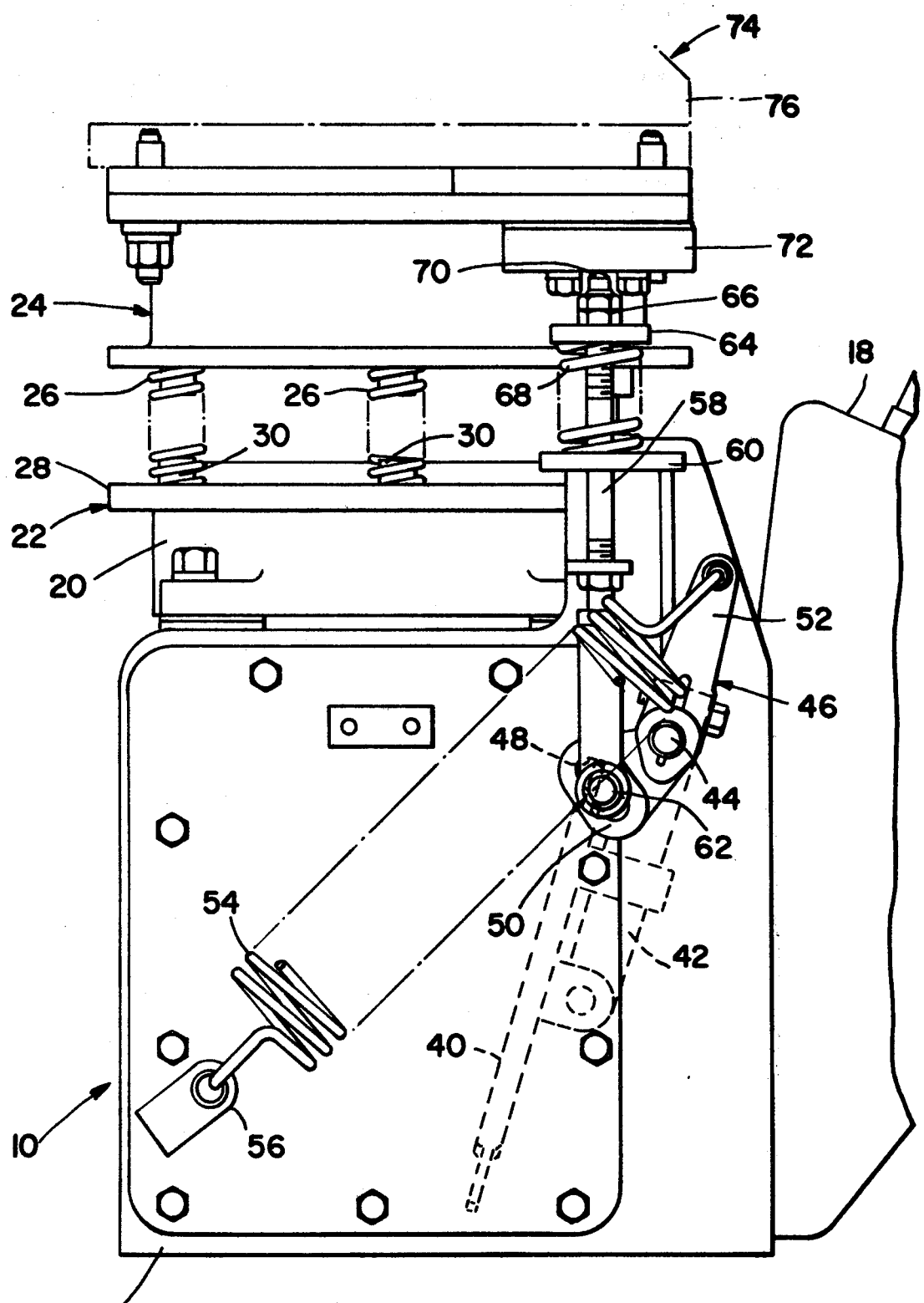

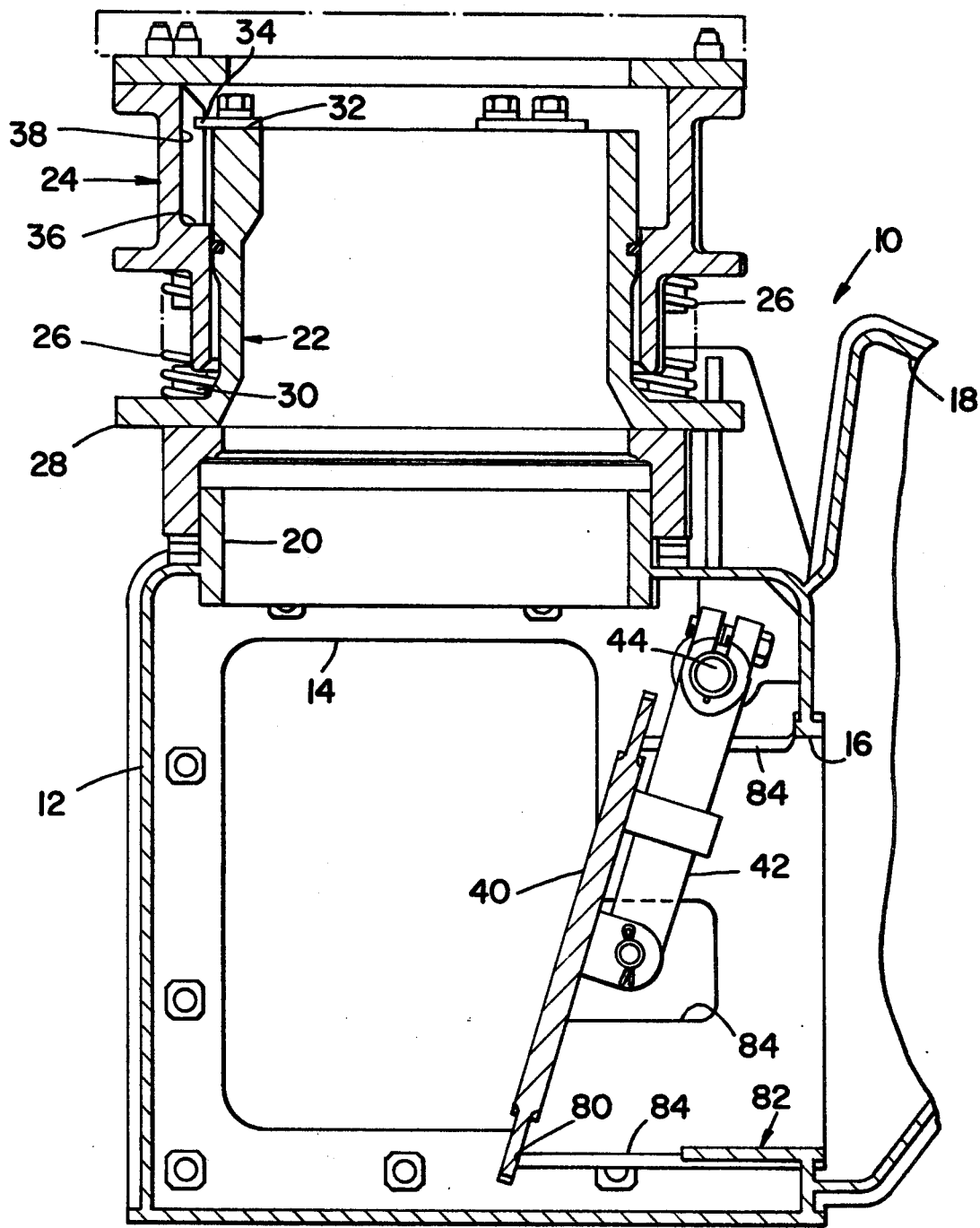
FIG_3

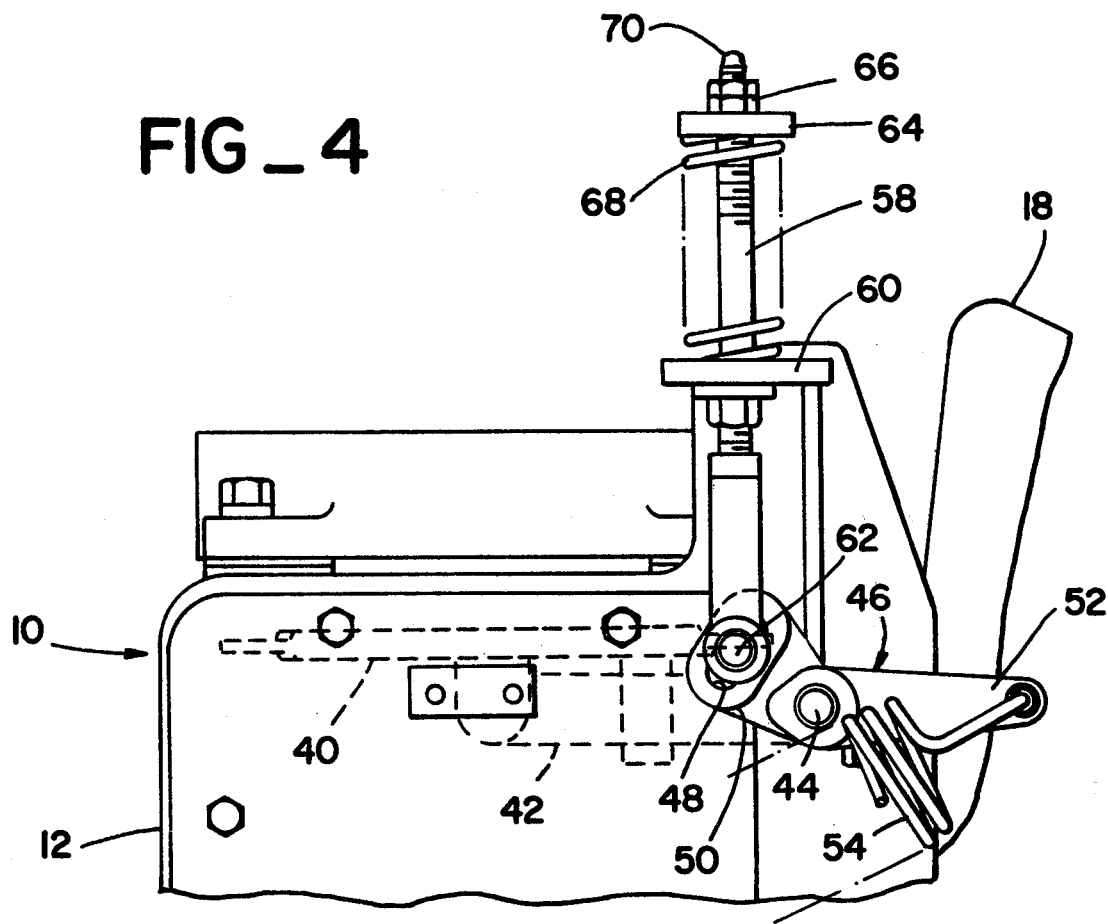
FIG_4
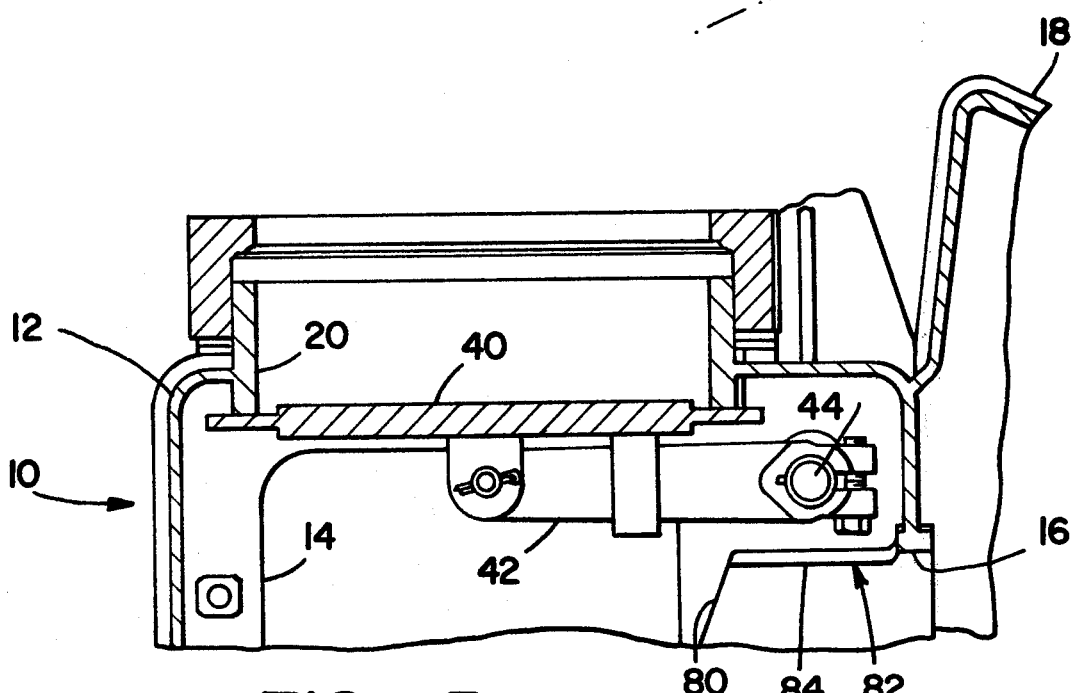
FIG_5

EXHAUST SYSTEM FOR VEHICLE

BACKGROUND OF THE INVENTION

This invention relates to a vehicle having a dump body, and means for directing vehicle engine exhaust through the body and/or through other exhaust conduit means.

As is well known, vehicles which include tiltable dump bodies are in widespread use for transporting of earth, minerals and the like from one location to another. The material transported is loaded into the vehicle dump body, and the dump body is tilted about a given axis at the point of discharge in order to dump the material. The material transported is often wet, with the result that cold weather operations are impeded by freezing of the wet material onto the transporting body, making dumping difficult or impossible. A well known way to avoid this difficulty is by heating of the dump body by means of the exhaust from the internal combustion engine which powers the vehicle. The engine exhaust is commonly introduced into the dump body with the body in a non-dump position, and the body connection with the engine exhaust piping is broken when the body is tilted for dumping purposes. A valve included in the system at this point directs engine exhaust through alternative exhaust conduit means, for example, including a muffler therein.

A problem with such a system is that generally either the full exhaust flow passes through the dump body, or the full exhaust flow passes through the muffler. The actuation of such valve cuts off exhaust flow through the muffler with the dump body in its non-dumping position. Thus, upon raising and lowering of the dump body, the muffler is subjected to successive heating and cooling, which is detrimental to long muffler life.

SUMMARY OF THE INVENTION

The present invention is directed to overcoming one or more of the problems as set forth above.

Broadly stated, the invention comprises a valve comprising a body having inlet means and first and second outlet means. A valving element is included and is movable to a first position providing communication between the inlet means and first outlet means, meanwhile blocking communication between the inlet means and second outlet means. The valving element is movable to a second position providing communication between the inlet means and second outlet means, meanwhile providing a degree of communication between the inlet means and first outlet means. The valving element is biased to its first and second positions by an over-center spring and is moved to its second position by a plunger connected thereto.

BRIEF DESCRIPTION OF THE DRAWINGS

Other objects of the invention will become apparent from a study of the following specification and drawings in which:

FIG. 1 is a front elevation of the valve incorporating the invention;

FIG. 2 is a side elevation of the valve of FIG. 1, with the valving element in one position;

FIG. 3 is a sectional view of the apparatus as shown in FIG. 2;

FIG. 4 is a partial view similar to that shown in FIG. 2, but with the valving element in another position; and FIG. 5 is a sectional view of the apparatus as shown in FIG. 4.

DESCRIPTION OF THE PREFERRED EMBODIMENT

Shown in the drawings is a valve 10 including a valve body 12 having an inlet 14 communicating therewith, through which exhaust gas from the internal combustion engine (not shown) of the vehicle enters the body 12. The valve body 12 also includes a lateral outlet 16 which in turn communicates with exhaust conduit means 18 including a vehicle muffler. The valve body 12 also includes an upwardly disposed flanged outlet 20. A flanged tube 22 is slideably mounted in a sleeve 24, and is resiliently biased in a downward direction relative to the sleeve 24 by a plurality of springs 26 interposed the flange 28 of tube 22 and the sleeve 24. The springs 26 are disposed on posts 30 secured to the flange 28 of tube 22 and the flange portion of sleeve 24.

The top surface 32 of the tube 22 has fixed thereto a plurality of tabs 34 which extend outwardly of the outer periphery of the tube 22. Such tabs 34 are positioned to coact with stepped portions 36 defined by the inner surface 38 of the sleeve 24, to limit the maximum downward movement of the flanged tube 22 relative to the sleeve 24 under the urging of the springs 26.

A valving element 40 in the form of a flapper is pivotally mounted to a lever 42 which is in turn secured to a shaft 44 pivotally mounted to the body 12, the flapper 40 and lever 42 being disposed within the body 12. The shaft 44 extends outwardly of the body 12 and has fixed thereto a link 46. The link 46 defines an elongated slot 48 at one end 50 thereof, and has an oppositely extending end 52. A helical spring 54 interconnects the end 52 and a tab portion 56 fixed to the body 12. A vertically disposed reciprocable plunger 58 is mounted to an extension 60 in turn fixed to the body 12. Plunger 58 at its lower end has a pin 62 which seats in the slot 48, the slot and pin arrangement 48,62 acting as a lost-motion connection, the operation of which will be described in detail further on. The plunger 58 at its upper end has a collar 64 secured thereto by means of a nut 66, and a helical spring 68 is disposed between the collar 64 and extension 60 so that the plunger 58 is resiliently urged in an upward direction by the spring 68. The upper end 70 of the plunger 58 is in contact with a plate 72 secured to the sleeve 24, so that upon upward and downward movement of the sleeve 24, the plunger 58 is moved upwardly and downwardly therewith relative to the body 12.

With the apparatus in the state shown in FIG. 1, with the sleeve 24 bolted to the body portion 76, the dump body 74 of the vehicle is in its lower or non-dumping position, with the body 22 sealingly engaged with the outlet 20 of the body 12. With the apparatus in such state, the plunger 58 has been forced downward so that the flapper 40 is in the position shown in FIG. 2, contacting an angled end 80 of a tubular portion 82 of the outlet 16. It is to be noted that the tubular portion 82 has lateral openings 84 therein also, so that communication is provided not only between the inlet 14 and the outlet 20, but also the inlet 14 and outlet 16. In such state, with the engine of the vehicle operating, exhaust enters the body 12 through the inlet 14, and exits from the body 12 through the outlet 20 and partially through the outlet 16 also.

Upon moving of the dump body 74 to the dump position, the body 74 and sleeve 24 are lifted away from the body 12 with the tube 22 remaining in contact with the body 12 under the resilience of the springs 26 until the tabs 34 contact the stepped portions 36. Further, lifting of the body 74 causes separation of the tube 22 from the body 12. During such operative movement, the plunger 58 is allowed to move upwardly, the initial movement thereof not providing any pivoting of the link 46 because of the lost-motion connection described above. Upon sufficient upward movement of the plunger 58, lost-motion in the connection is taken up, and the link 46 is pivoted clockwise to start movement of the flapper 40 toward its upper position, such movement continuing until the connection of the spring 54 and link 46 moves beyond the axis of shaft 44, whereupon the spring 54 will act to move the link 46 so as to pivot the flapper 40 to its full upward position as shown in FIG. 3. The flapper 40 blocks the outlet 20, before flanged tube and outlet 20 separate, and full exhaust flow from the engine exits from the body 12 through the outlet 16.

Movement of the dump body 74 to its downward position urges the plunger 58 downward after tube 22 and outlet 20 have contacted. Upon initial pickup of the lost-motion in the connection described above, the flapper 40 is moved downwardly, the link 46 being moved in a counter-clockwise direction. Such movement of the flapper 40 occurs only after the tube 22 is sealingly engaged with the body 12. Upon movement of the connection of the spring 54 and link 46 in one direction beyond the axis of shaft 44, the spring 54 acts to move the flapper 40 into an upward position with the flapper 40 adjacent such upward position, and upon movement of the connection in the other direction, resiliently biases the flapper 40 into a downward position with the flapper 40 adjacent such downward position.

It is to be noted that with the flapper 40 in the position shown in FIG. 2, most of the exhaust flow takes place through the outlet 20 and through the dump body frame portion 76. However, because of the lateral opening slots 84, some of the exhaust flows from the outlet 16, and through the muffler. Thus, the muffler is not subjected to a complete cutting off of exhaust flow therethrough, and a subsequent full flow of exhaust therethrough, which, as pointed out above, is detrimental to muffler life.

It should also be noted that upon removal of the plate 72 from the sleeve 24, such plate 72 being attached thereto so as to be readily removed therefrom, the plunger 58 is in its fully upward position at all times. This establishes the valving element 40 position as shown in FIG. 4 or 5, whereupon full exhaust gas passes through the exhaust conduit means 18, without the possibility of any passing through the outlet 20 (and through a truck body). This may be desirable in warm weather, or when the exhaust is highly corrosive.

The embodiments of the invention in which an exclusive property or privilege is claimed are defined as follows:

1. A valve arrangement comprising:
 a body having inlet means and first and second outlet means;
 a valving element in the body and movable to a first position providing communication between the inlet means and first outlet means, and movable to a second position providing communication between the inlet means and second outlet means;
 means for providing movement of the valving element comprising over-center spring means resiliently biasing the valving element into the first position with the valving element adjacent the first position, and resiliently biasing the valving element into the second position with the valving element adjacent the second position; wherein the means for providing movement of the valving element further comprise a plunger movably mounted relative to the body, and a lost-motion connection operatively connecting the plunger and valving element for providing that upon initial movement of the plunger in one direction from a first to a second position thereof with the valving element in its first position, the valving element remains in its first position with the plunger moved to an extent toward its second position, and for providing that upon initial movement of the plunger in another direction from its second toward its first position with the valving element in its second position, the valving element remains in its second position with the plunger moved to an extent toward its first position.

2. The apparatus of claim 1 and further comprising an engine exhaust conduit communicating with the intake means and an exhaust outlet conduit communicating with the first outlet means.

3. The apparatus of claim 2 and further comprising resilient spring means for overall biasing of the plunger towards its first position.

4. The apparatus of claim 1, and further comprising means for providing movement of the valving element comprising means operatively coupled with the valving element and being readily removable so that the valving element remains in one position.

5. The apparatus of claim 4 wherein the means for providing movement of the valving element comprises plate means operatively associated with the plunger, and readily removable so that the valving element remains in one position.

* * * * *